United States Patent
Easo et al.

(10) Patent No.: US 9,104,998 B2
(45) Date of Patent: Aug. 11, 2015

(54) INTEGRATED PRODUCTION LOSS MANAGMENT

(71) Applicant: Accenture Global Services Limited, Dublin (IE)

(72) Inventors: Ajay Kurian Easo, Chicago, IL (US); David H. Kil, Santa Clara, CA (US); Zhu-Song Mei, Chicago, IL (US); Baiju Shah, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 25 days.

(21) Appl. No.: 13/939,994

(22) Filed: Jul. 11, 2013

(65) Prior Publication Data

US 2013/0297377 A1    Nov. 7, 2013

Related U.S. Application Data

(63) Continuation of application No. 12/178,466, filed on Jul. 23, 2008, now Pat. No. 8,510,151.

(51) Int. Cl.
*G06Q 10/06*    (2012.01)

(52) U.S. Cl.
CPC ............ *G06Q 10/0635* (2013.01); *G06Q 10/06* (2013.01); *G06Q 10/06375* (2013.01); *G06Q 10/06393* (2013.01)

(58) Field of Classification Search
CPC combination set(s) only.
See application file for complete search history.

(56) References Cited

U.S. PATENT DOCUMENTS

| | | | |
|---|---|---|---|
| 5,615,109 A * | 3/1997 | Eder | 705/7.12 |
| 6,473,084 B1 | 10/2002 | Phillips et al. | |
| 6,658,467 B1 | 12/2003 | Rice et al. | |
| 7,783,428 B2 | 8/2010 | Gustafsson et al. | |
| 8,769,412 B2 * | 7/2014 | Gill et al. | 715/736 |
| 2002/0174384 A1 * | 11/2002 | Graichen et al. | 714/37 |
| 2003/0191606 A1 | 10/2003 | Fujiyama et al. | |
| 2004/0078171 A1 * | 4/2004 | Wegerich et al. | 702/188 |
| 2007/0027593 A1 * | 2/2007 | Shah et al. | 701/30 |
| 2009/0313041 A1 | 12/2009 | Eder | |
| 2010/0292857 A1 * | 11/2010 | Bose et al. | 700/292 |

OTHER PUBLICATIONS

U.S. Non-Final Office Action for U.S. Appl. No. 12/178,466 dated Apr. 4, 2011, 14 pages.
U.S. Final Office Action for U.S. Appl. No. 12/178,466 dated Oct. 19, 2011, 12 pages.
U.S. Non-Final Office Action for U.S. Appl. No. 12/178,466 dated Feb. 13, 2012, 13 pages.
U.S. Notice of Allowance for U.S. Appl. No. 12/178,466 dated Apr. 26, 2013, 8 pages.

* cited by examiner

*Primary Examiner* — Thomas Mansfield
(74) *Attorney, Agent, or Firm* — Fish & Richardson P.C.

(57) ABSTRACT

Current monitoring systems often provide the operating condition of a specific component and do not consider the impact of a specific failure upon an entire system or a business. Nor do the current systems provide an avenue for the business to predict the loss, as well as its impact, and make an educated decision of mitigating the loss based upon economic, environmental, and health and safety considerations. Methods and systems are provided for predicting loss events, impacts of loss events, and providing potential corrective measures to reduce or eliminate the occurrence or impact of the loss events. One aspect relates to the use of system-wide information to predict variables that are directly linked to business impact, such as production loss. Extraneous and transactional data are also utilized according to other aspects of the invention.

18 Claims, 7 Drawing Sheets

INTEGRATED PRODUCTION LOSS MANAGMENT

FIELD OF THE INVENTION

This invention relates generally to industrial loss events. More particularly, aspects of the invention provide methods and systems for predicting loss events, impacts of loss events, and/or providing potential corrective measures to reduce or eliminate the occurrence or impact of the loss events.

DESCRIPTION OF RELATED ART

Businesses are increasingly utilizing automation technologies to monitor specific components of an industrial system. For example, in the oil and gas industry it is quite common to monitor the specific components that are required to extract crude oil and/or natural gas. By doing so, workers may be notified when the component, such as a pump, fails or otherwise ceases to operate at full capacity. Indeed, unanticipated and preventable production losses due to plant equipment failure, production chemistry anomaly, pipeline corrosion, etc. can be a significant source of waste, environmental pollution, and profit erosion.

While automated monitoring systems may notify workers of specific failures in regards to an individual component, current monitoring systems cannot adequately predict loss events. For example, the repair of a broken pump may readily be associated with a cost for labor, downtime, and a replacement pump, however, other costs, such as environmental, and/or health and safety of the workers are not considered or calculated. Furthermore, other loss events related to the pump failure are not indicated. For example, the failure of the pump may be indicative of another failure event that is not directly related to the operation of the pump. Also, data regarding the pump's functioning may indicate that the pump is fully operational, however, slight variations within the normal operating range of the pump may foretell the failure of other equipment. Indeed, in the oil and gas industry a very small rise in temperature over an extended period of time in pipes extracting crude oil could be considered a normal fluctuation within predefined limits and often goes unnoticed by workers. This is especially true when workers often change shifts every 8 to 12 hours and have other tasks besides monitoring the output of the sensor reporting the temperature. The small fluctuation in temperature, however, may foretell the failure of other equipment or an indication of contamination in the pipe, which leads to loss in the terms of economic loss, environmental contamination, and/or pose a risk for the health and safety of the plant workers or surrounding people.

Therefore, current systems may provide an insight to the failure of a single component, but do not provide an estimate that failure's impact upon the business. Nor do the current systems provide an avenue for the business to predict the loss, as well as its impact, and make an educated decision of mitigating the loss based upon g economic, environmental, and health and safety considerations. Therefore, there is a need in the art for systems and methods for predicting loss events, impacts of loss events, and/or providing potential corrective measures to reduce or eliminate the impact of the loss events.

BRIEF SUMMARY OF THE INVENTION

Aspects of the invention overcome problems and limitations of the prior art by providing systems and methods that may focus on key business concerns. One aspect relates to the use of system-wide information to predict variables that are directly linked to business impact, such as production loss. In one embodiment, operational data from a plurality of sensors, and transactional data are collected and utilized. Yet in other embodiments, only a subset of the total data is utilized. In certain embodiments, the subset of data selected for utilization may be based upon one or more thresholds. In certain embodiments, the collected data is utilized to determine which, if not all, of the collected data is considered. In yet other embodiments, extraneous data is also utilized. A plurality of statistical models may be applied to the selected system-wide data to determine a best-fit model in regards to the correlation among the operational data and extraneous data with the transactional data to predict events and impacts of the predicted events. In further embodiments, features may be applied to at least a portion of the selected data to amplify patterns before applying the data to the predictive model. In further embodiments, occasional sensor anomalies with little business impact may be ignored.

In another aspect, systems and methods may utilize the best-fit model to determine at least one intervention to reduce or eliminate the impact of the predicted events. The models may also be updated with additional collected data. In one embodiment, one or more predictions directly or indirectly based upon the best-fit model may be compared to an outcome to determine the accuracy of the best-fit model. In yet other embodiments, the actual outcome may be compared to other models, such as the models not considered as accurate as the best-fit model, to determine if another model is more accurate than the best-fit model initially chosen.

The systems and methods may be stored and/or distributed on computer-executable mediums. The systems and methods may also utilize one or more computer-readable instructions on computer-readable mediums for performing one or more of the disclosed methods. The computer-executable instructions may be stored on any tangible computer-readable medium, such as a portable memory drive or optical disk.

BRIEF DESCRIPTION OF THE DRAWINGS

The present invention is illustrated by way of example and not limited in the accompanying figures in which like reference numerals indicate similar elements and in which:

FIG. 3 shows an exemplary industrial system that one or more embodiments of the invention may be applied to;

DETAILED DESCRIPTION

Figure 1:
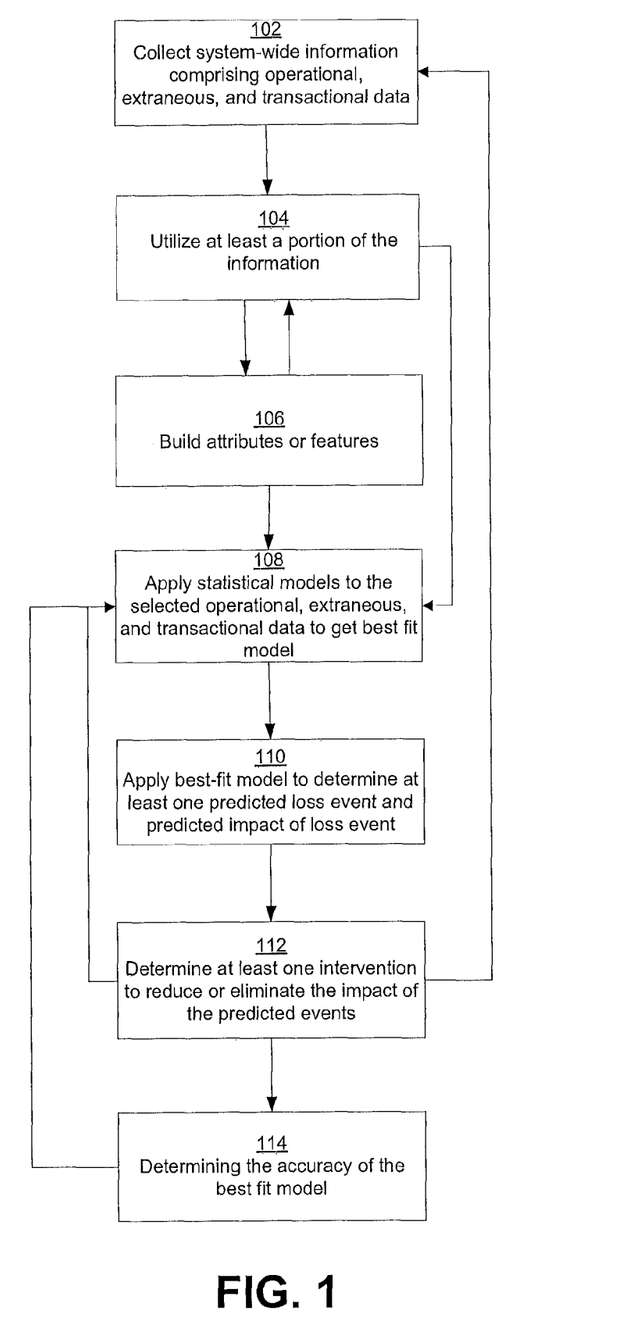
FIG. 1 is a flowchart demonstrating an exemplary method according to one embodiment of the invention.

FIG. 1 is a flowchart demonstrating an exemplary method according to one embodiment of the invention. As seen in FIG. 1, a method according to one or more embodiments of the invention collects system-wide information comprising operational data from a plurality of sensors, extraneous data, and transactional data (step 102). As used herein, a "system" refers to a plurality of components and/or subsystems utilized in the production of a good or service. The system may be spread throughout several geographic locations and/or include one or distinct subsystems. For example, an oil and gas collection system may comprise several subsystems, such as: reservoirs, wells, plants, and/or export subsystems. Thus, "system-wide information" includes information regarding one or more components throughout several subsystems. In this regard, embodiments of the invention view the production of the goods or services at the process or business level rather than single discrete components.

As used herein, operational data includes data originating at or otherwise obtained (directly or indirectly) from any of a plurality of sensors throughout a system that measures one or more operation parameters within the system. In one such embodiment, the operational data may be collected substantially upon being received or measured at the sensor. For example, one or more sensors may measure data on a consistent basis over a period of time. As one example, in the oil and gas industry it may be desirable to collect data regarding oil pressure of a collection point every second. In that scenario, the sensor may consistently provide operational data for collection. In yet other embodiments, operational data may be stored on one or more computer-readable mediums in one or more formats for subsequent collection.

In certain embodiments of the invention, not all of the operational data measured at one or more sensors is collected. For example, only a fraction of the total detected parameters from a specific sensor may be included in any collection efforts. For example, merely because a parameter is measured every second, there is no requirement that every data point is collected. Rather, in one embodiment, only a predetermined fraction of the data (e.g., one data point per minute) may be collected in step 102. Indeed, while the operational data may be collected in a. "system-wide" manner, there is no requirement that the collected data include data from every sensor in the system. Rather, the collection of "system-wide" operational data as used herein is data that is received from a plurality of sensors that are located in different components within a system, and wherein at least one datum is collected from a sensor that is considered part of a different component than at least another sensor and is not directly connected to the other component mechanically, hydraulically, or electrically or otherwise directly dependent on at least one other component. For example, the failure of one component having a sensor would not directly impact the working order of another component. Indeed, some components within the system may, in the minds of those skilled in the art, not even be considered to have a tangential relationship with another component. As explained below, however, the inventors have discovered novel methods and systems for discovering relationships between components throughout a system and predicting loss events based upon the measurements of sensors within the system.

As used herein, the term "collect" also encompasses the storage on one or more computer-readable mediums. Indeed, the collection of data is not required to be a single event, rather the collection of data may encompass irregular storage of data across several computer-readable mediums. Furthermore, various embodiments of the invention may be implemented with computer devices and systems that exchange and process data. In feet, with the benefit of this disclosure, those skilled in the art will readily appreciate that several computing and/or networking environments may be utilized to carry out one or more embodiments of the invention. For discussion purposes, FIG. 2 provides an exemplary environment for performing one or more embodiments of the invention.

Figure 2:
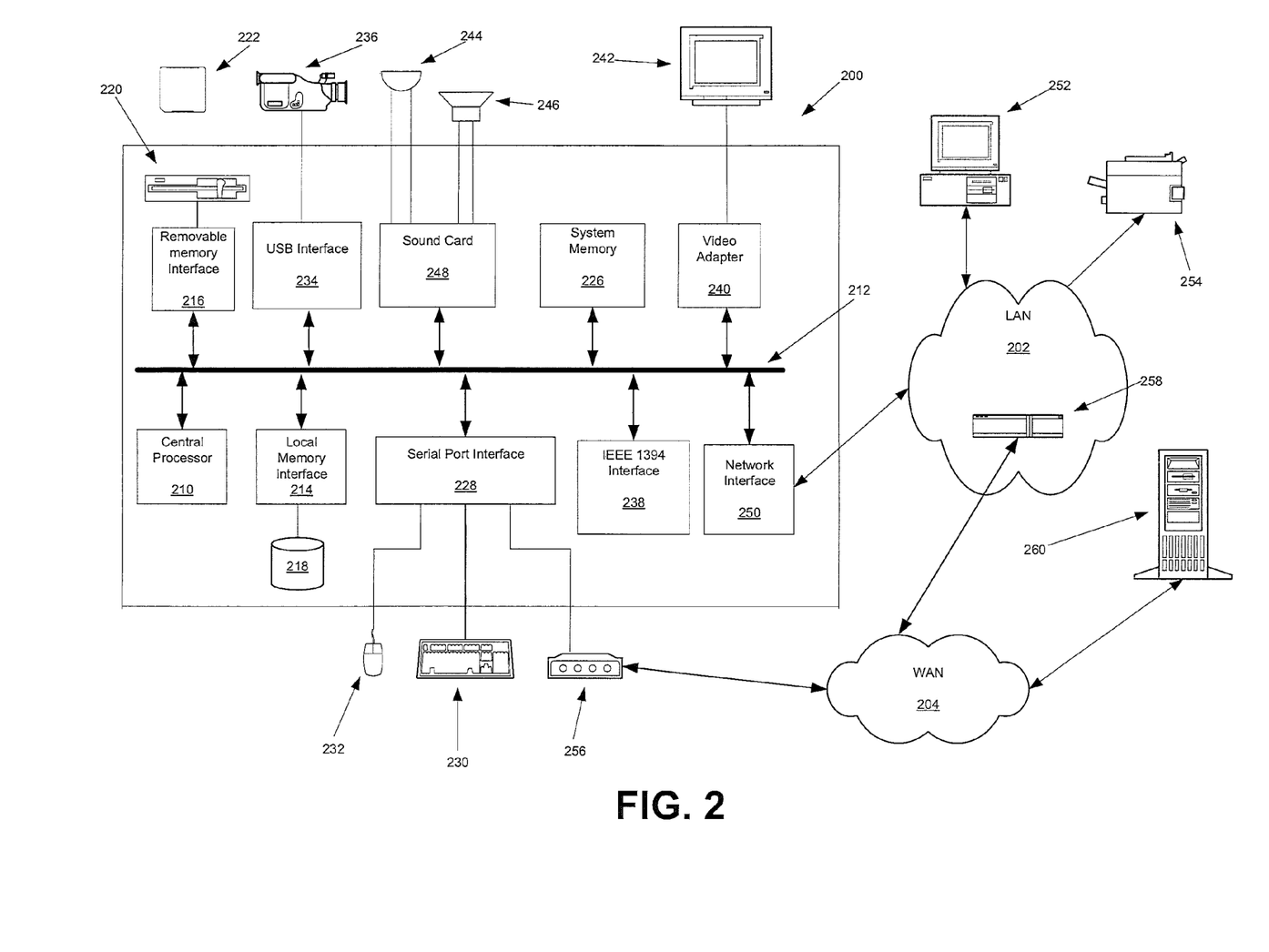
FIG. 2 shows a computing environment a may be utilized in accordance with one or more embodiments of the invention.

Elements of an exemplary computer system are illustrated in FIG. 2, in which the computer 200 is connected to a local area network (LAN) 202 and a wide area network (WAN) 204. Computer 200 includes a central processor 210 that controls the overall operation of the computer and a system bus 212 that connects central processor 210 to the components described below. System bus 212 may be implemented with any one of a variety of conventional bus architectures.

Computer 200 can include a variety of interface units and drives for reading and writing data or files. In particular, computer 200 includes a local memory interface 214 and a removable memory interface 216 respectively coupling a hard disk drive 218 and a removable memory drive 220 to system bus 212. Examples of removable memory drives include magnetic disk drives and optical disk drives. Hard disks generally include one or more read/write heads that convert bits to magnetic pulses when writing to a computer-readable medium and magnetic pulses to bits when reading data from the computer readable medium. A single hard disk drive 218 and a single removable memory drive 220 are shown for illustration purposes only and with the understanding that computer 200 may include several of such drives. Furthermore, computer 200 may include drives for interfacing with other types of computer readable media such as magneto-optical drives.

Unlike hard disks, system memories, such as system memory 226, generally read and write data electronically and do not include read/write heads. System memory 226 may be implemented with a conventional system memory having a read only memory section that stores a basic input/output system (BIOS) and a random access memory (RAM) that stores other data and files.

A user can interact with computer 200 with a variety of input devices. FIG. 2 shows a serial port interface 228 coupling a keyboard 230 and a pointing device 232 to system bus 212. Pointing device 232 may be implemented with a hard-wired or wireless mouse, track ball, pen device, or similar device.

Computer 200 may include additional interfaces for connecting peripheral devices to system bus 212. FIG. 2 shows a universal serial bus (USB) interface 234 coupling a video or digital camera 236 to system bus 212. An IEEE 1394 interface 238 may be used to couple additional devices to computer 200. Furthermore, interface 238 may be configured to operate with particular manufacture interfaces such as FireWire developed by Apple Computer and i.Link developed by Sony. Peripheral devices may include touch sensitive screens, game pads scanners, printers, and other input and output devices and may be coupled to system bus 212 through parallel ports, game ports, PCI boards or any other interface used to couple peripheral devices to a computer.

Computer 200 also includes a video adapter 240 coupling a display device 242 to system bus 212. Display device 242 may include a cathode ray tube (CRT), liquid crystal display (LCD), field emission display (FED), plasma display or any other device that produces an image that is viewable by the user. Sound can be recorded and reproduced with a microphone 244 and a speaker 246. A sound card 248 may be used to couple microphone 244 and speaker 246 to system bus 212.

One skilled in the art will appreciate that the device connections shown in FIG. 2 are for illustration purposes only and that several of the peripheral devices could be coupled to system bus 212 via alternative interfaces. For example, video camera 236 could be connected to IEEE 1394 interface 238 and pointing device 232 could be connected to USB interface 234.

Computer 200 includes a network interface 250 that couples system bus 212 to LAN 202. LAN 202 may have one or more of the well-known LAN topologies and may use a variety of different protocols, such as Ethernet. Computer 200 may communicate with other computers and devices connected to LAN 202, such as computer 252 and printer 254. Computers and other devices may be connected to LAN 202 via twisted pair wires, coaxial cable, fiber optics or other media. Alternatively, radio waves may be used to connect one or more computers or devices to LAN 202.

A wide area network 204, such as the Internet, can also be accessed by computer 200. FIG. 2 shows a modem unit 256 connected to serial port interface 228 and to WAN 204. Modem unit 256 may be located within or external to computer 200 and may be any type of conventional modem, such as a cable modem or a satellite modem. LAN 202 may also be used to connect to WAN 204. FIG. 2 shows a router 258 that may connect LAN 202 to WAN 204 in a conventional manner. A server 260 is shown connected to WAN 204. Of course, numerous additional servers, computers, handheld devices, personal digital assistants, telephones and other devices may also be connected to WAN 204.

The operation of computer 200 and server 260 can be controlled by computer-executable instructions stored on a computer-readable medium 222. For example, computer 200 may include computer-executable instructions for transmitting information to server 260, receiving information from server 260 and displaying the received information on display device 242. Furthermore, server 260 may include computer-executable instructions for transmitting hypertext markup language (HTML) and extensible markup language (XML) computer code to computer 200.

As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 202, 204, but also a "content network," which is comprised of the data—attributable to a single entity—which resides across all physical networks.

Figure 3:
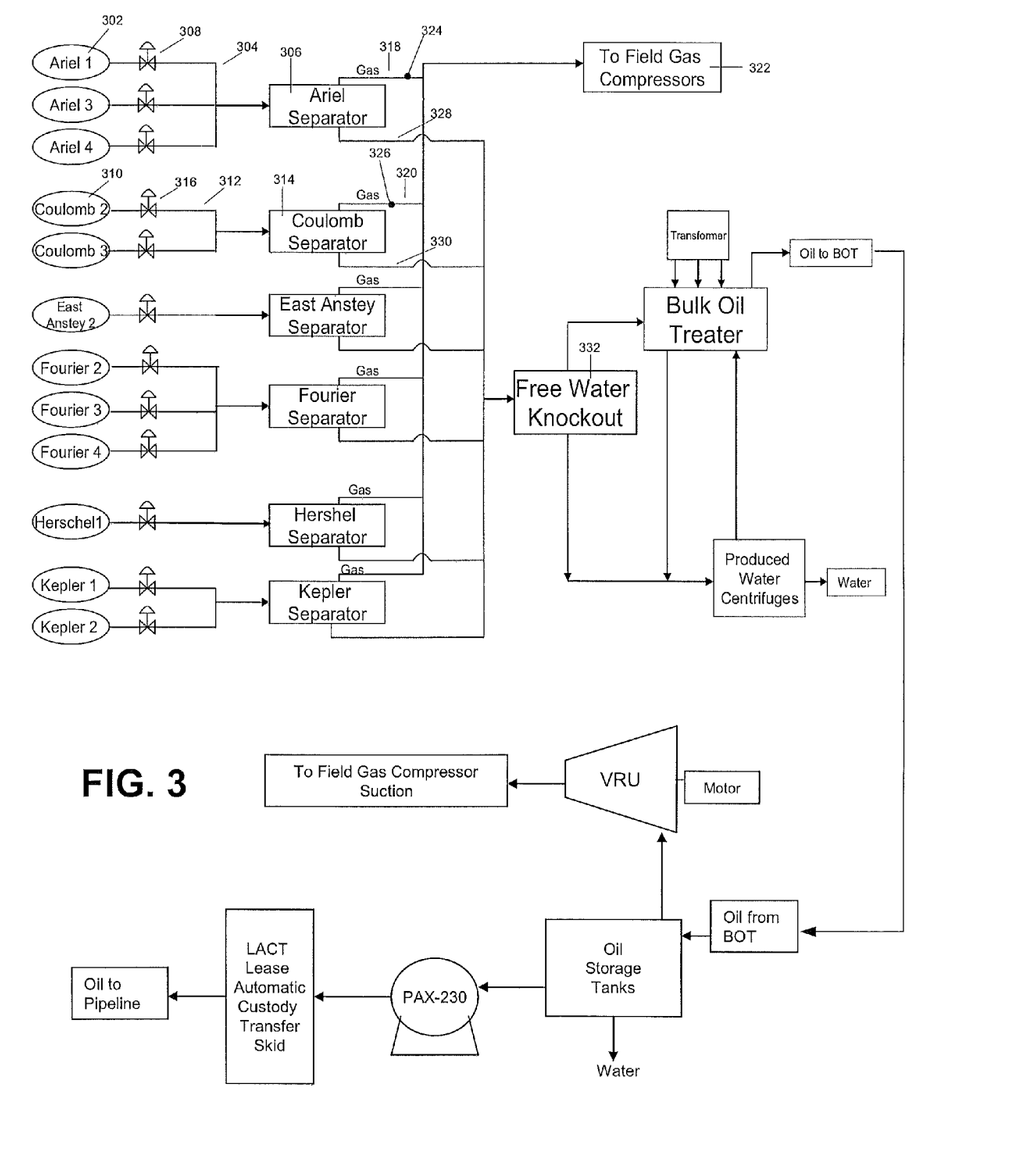
Figure 4A:
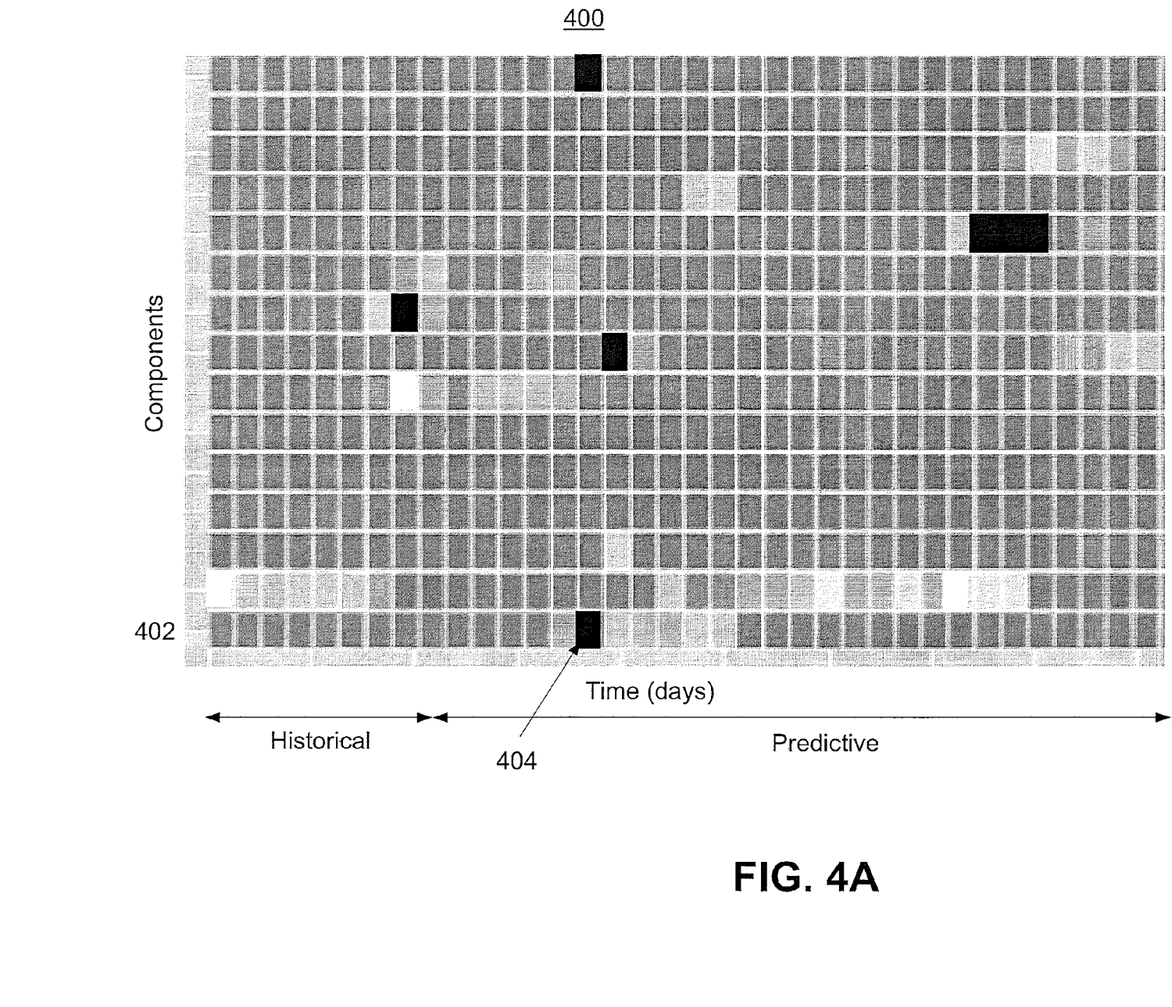
FIGS. 4A, 4B and 4C illustrate exemplary displays that may be utilized in accordance with one or more embodiments of the invention.
Figure 4B:
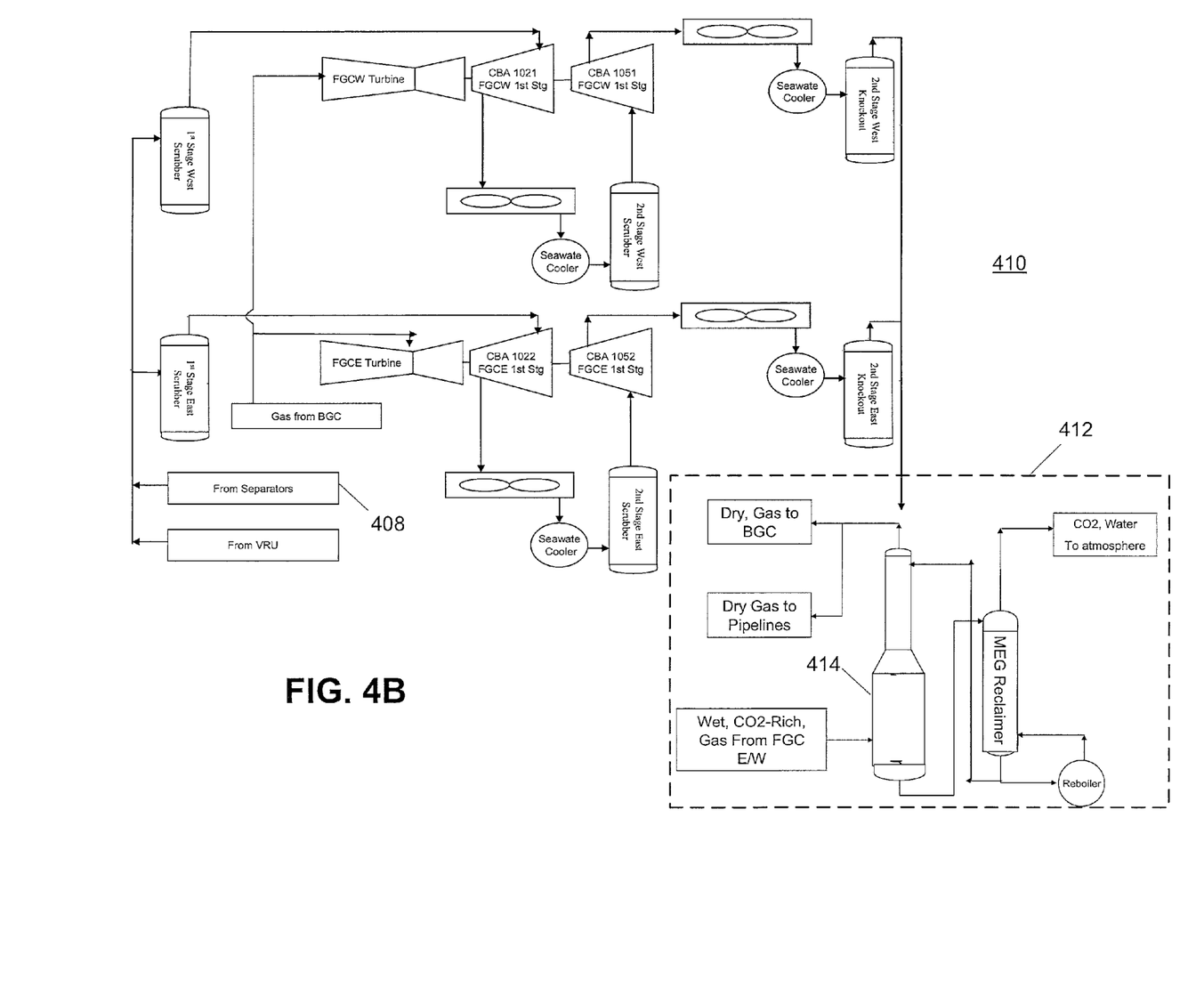

Returning now to specific implementations, FIG. 3 more clearly shows an exemplary system that may benefit from one or more embodiments of the invention. As shown on the top left side of the figure, pump 302 is operatively connected to pipe 304, which terminates at separator 306. Pump 302 may be used to pump a liquid, such as crude oil being excavated from an underwater drilling facility. As the liquid is passed to separator 306, sensor 308 may measure temperature of the liquid within pipe 304. Those skilled in specific arts, such as oil and gas production, understand that specific processes of pumping oil may not utilize the structures shown in FIG. 3, however, the basic teachings of FIG. 3 are shown to demonstrate that the systems and methods of the invention may be applied to a vast array of multi-component systems. Likewise, pump 310 may be used to pump the same or different material than the material being pumped by pump 302, such as crude oil. As the gas travels through pipe 312 to separator 314, sensor 316 measures a parameter, such as pressure, temperature, estimated flow rate, etc. The functionality of pump 302 is not dependent upon the functionality of pump 310 and vice-versa. Specifically, each pump (302, 310) may pump a different gas or liquid to a different separator and does not rely on an output of the other to function. Thus, in the embodiments shown in FIG. 3, pumps 302 and 310 are considered part of different subunits within the system and that the failure of pump 302 would not directly impact the functionality of pump 310. Thus, some components of the system (e.g., such as pumps 302 and 310), may, in the minds of those skilled in the art, not even be considered to have a tangential relationship with each other. To the contrary, the failure of a cooling system, for example, for one of the pumps 302, 310 may directly impact the output of the pump, such as lower output and/or the failure of the pump, resulting in no output. Like pumps 302 and 310, separators (306, 314) may also be geographically spaced apart and thus considered different subunits or subsystems of the overall system. FIG. 4B (discussed in more detail later) shows further subsystems that may be within the system shown in FIG. 3.

As further seen in FIG. 3, each of the separators 306, 314 may be used to separate the natural gas from the oil. For example, extracted gas from separators 306, 314 may travel by pipes 318, 320, respectively to field gas compressors (see element 322). Pipe 318 may comprise sensor 324 that measures a parameter and pipe 320 may comprise sensor 326 that measures a parameter, such as flow rate, compression, temperature, and/or combinations thereof. Conversely, the remaining oil product may travel by pipes 328 and 330 to a different processing subunit or subsystem (see element 332). As explained in more detail later in the Specification, subsystems utilized in processing the extracted gas from pipes 318 and 320 are distinct from subsystems utilized for processing the oil, however, information one subsystem may be used to predict loss event and/or the severity of a loss event that may occur in another subsystem.

As discussed above in regards to step 102, extraneous data may also be collected. As used herein, extraneous data excludes any data directly regarding the creation, processing, or manufacturing of the goods or services being produced by the system. For example, extraneous data may include data that either 1) originated outside the system, or 2) data originating inside the system regarding the measurement of an external impact source upon the system and would exclude any man-made intended input or output of the system or data regarding the processing or manufacturing of the goods and/or services. Using the system of FIG. 3 as an example, the output, electrical consumption, and or working parameters of the pumps 302, 310 and/or the separators 306, 314 would not be considered extraneous data. Outside forces acted upon one or more of the components of FIG. 3, however, would be considered extraneous data.

In one embodiment, extraneous data may include event data, such as environmental data. The extraneous data may be collected directly from a plurality of sensors connected to or associated with the system. Yet in other embodiments, the sensors are not associated with the system. In either embodiment, the sensors would measure extraneous data, as opposed to system operational data. Yet in other embodiments, the data, such as weather data may be historical and obtained after the occurrence of the event from which the data relates to. In this regard, there is no requirement that the data utilized be received from a sensor. Rather, the extraneous data may be already modified or otherwise manipulated, for example subjected to statistical analysis before collection at step 102. The data may be stored on one or more computer-readable mediums. In yet other embodiments, the extraneous data may be modeled from an event and not be actual results or information received at one or more sensors during the event.

Step 102 further includes the collection of transactional data. As used herein, transactional data includes any data comprising information regarding the intentional modification of the system. In one embodiment, the transactional data comprises maintenance data. Maintenance data (or any type of transactional data) may include what component was added or removed from the system of FIG. 3, such as one or more of the pumps 302, 310 and/or separators 306, 314. Maintenance data may also include the part number, the manufacturer of the component, the individual who made the addition or removal of the component, the time and/or date of the modification, or other situational data surrounding the intentional input or output to the system.

As shown in FIG. 1, the method may further include step 104 which comprises the selection of at least a portion, if not all, of the information from the system-wide information collected at step 102 to conduct statistical analysis upon. In one embodiment, it may be determined that all the data collected may be utilized, however, in other embodiments it may not be either feasible and/or desirable to utilize all of the collected data. For example, several industries, including the oil and gas industry, employ complex systems that comprise thousands of sensors in a plurality of different configurations. For example, a pump, such as pump 302 may report a measured parameter every second or even several parameters every second, whereas another sensor located either upstream or downstream front the pump, such as sensor 224 may only report a sensor parameter every minute or hour. As would be appreciated by those skilled in the art, it may not be feasible to utilize every value from every sensor given the large quantity of sensors and/or parameter values for those sensors. Therefore, in one embodiment, the step of selecting which of the collected system-wide information to conduct statistical analysis on comprises the utilization of a threshold.

A threshold may be any value point in which parameters either above or below that value point are not considered in further analysis. For example, the utilization of every data point may introduce errors from impacts that are not likely to occur again. Using collected extraneous data as an example, the exclusion of event data regarding weather that is unlikely to occur again through a predefined time-period may be beneficial. A frequency threshold may also be utilized to exclude data associated with such an event or any event that did not occur above a certain frequency. For example, parameters obtained from a sensor regarding the wind (e.g., speed and/or duration), rainfall (e.g., speed, duration, accumulation), or combinations thereof may be utilized. Either taken individually or in combination, such sensor parameters may define a time period for Which to exclude operational data and/or transactional data correlating to that particular time of the event.

In yet another embodiment, an impact threshold may be utilized remove a portion of the collected data from further analysis. For example, if a repetitive occurrence routinely or consistently provides an impact below a significant amount, data associated with the impact may be excluded. In yet another embodiment, the impact is considered unavoidable. The impact threshold may be environmental, economic, relate to health and safety, and combinations thereof.

Further embodiments of the invention may include step 106, where one or more features or attributes are built from operational data from at least one of the plurality of sensors in the system. Such a process may be useful, for example, to investigate what sensors provide data of interest, how to best amplify the signals with transformations or features, and determine what transformation or features are most pertinent for a given sensor. Those skilled in the art will readily appreciate that there are a wide variety of features that may be used in the various embodiments of the invention. Some exemplary features and their descriptions are provided in Table 1. The inventors have found the features provided in Table 1 to provide successful and favorable results, however, the scope of the invention is not limited to the disclosed features. Furthermore, those skilled in the art will readily appreciate that one or more different features may be applied to specific groups of sensor data while other features are applied to another group. Still yet, in certain embodiments, specific sensor data may not have features applied.

TABLE 1

Exemplary Features

| Features | Descriptions |
| --- | --- |
| Mean amplitude | $1^{st}$ order moment from interpolated series |
| Std dev amplitude | $2^{nd}$ order moment |
| Skewness amplitude | $3^{rd}$ order moment |
| Kurtosis amplitude | $4^{th}$ order moment |
| Fraction of outliers | |
| Mean, Std dev, Skewness and Kurtosis spectrum | $1^{st}, 2^{nd}, 3^{rd}$, and $4^{th}$ order moment from the Fast Fourier Transform (FFT) spectrum |
| Peak freq | |
| Non-zero fraction | Non-zero fraction of time samples |
| # of diff sampling rates | The number of different sampling rates in raw time series |
| Singular 12 value ratio | From the SVD of data matrix, the ratio of the largest singular value to the next largest |
| Singular 34 value ratio | |
| Sval exp slope | Least squares slope estimate of log singular value vs. # of singular values ordered from the largest to the smallest |
| Sval reg R^2 | R-squared value of the slope estimator |
| Sval reg F statistic | F-statistic of the slope estimator |
| # of thrU crossings | @ of samples that are above up threshold (mean + k * sigma) from interpolated time series after constant false alarm rate (CFAR) processing |
| @ of thrD crossings | # of samples that are below down threshold |
| DWF coeff 1, 2, 3, & 4 | The four most important DWT coefficients with Villasenor DWT filter |

In certain embodiments, step 106 may be incorporated into step 104, yet in other embodiments, step 106 is independent from step 104. For example, in one instance where step 106 is incorporated into step 104, the features are applied to data before step 104, and thus the results of step 106 may be used in determining which of the sensor data is utilized in one or more further steps. In another embodiment, step 106 may be conducted after 104, however, the results of step 106 may be used in subsequent processes utilizing step 104. Specifically, in one embodiment, upon the application of the features, it may be determined to alter the selection of the portion of the collected system-wide information that is utilized. Thus, step 104 may be repeated. Yet in embodiment where steps 104 and 106 are independent, step 106 may only be used on a subset of the data selected in step 104. Yet, in other embodiments, step 106 may be omitted.

As shown in step 108, a plurality of statistical models may be applied to the selected operational data, extraneous data, and transactional data (whether with, partially with, or without one or more features applied to at least a portion of the selected data). Specifically, the models are applied to determine a best-fit model in regards to the correlation among the operational data and extraneous data with the transactional data to predict events and impacts of the predicted events. In one embodiment, each of a selected group of statistical models are applied to the data. Yet in another embodiment, only one or more specific statistical models are applied to specific data. For example, if one statistical model is more accurate at predicting a specific event and/or the impact of that loss when applied to data specific to one or more sensors, then the model(s) may only be applied to that data. In yet further embodiments, as systems change or extraneous forces upon the systems change, one model that was highly accurate when applied to specific data may no longer be the best model, thus according to certain embodiments, the models may be used to further test the accuracy of selected models. Furthermore, step 108 may further comprise the investigation of any correlation of specific sensor data with other sensor data.

Those skilled in the art will readily appreciate that there are a wide variety of statistical models that may be used in the various embodiments of the invention. Some exemplary models that may be used in accordance with one or more embodiments of the invention include a Baysean Network which provides a probabilistic approach where a structured model is created with conditional probabilities defined for relationships between nodes in the model. Similarity Based Modeling (i.e., SmartSignal SBM) may be also be used as a non-parametric technique that constructs a function surface entirely based on training data by using interpolation to produce estimates for every point. Decision Trees may also be used, where internal nodes are simple decision rules on one or more attributes and leaf nodes are predicted class labels. Other algorithms that may be used include Multivariate Linear Regression and Support Vector Machines. The inventors have also discovered that Multivariate Gaussian models are especially accurate in specific embodiments of the invention to predict loss events in the oil and gas extraction industry.

The models may be used to provide an outcome for predicting events and impacts of the predicted events. The predicted events are events which will cause a loss in terms of economic, environmental, and/or health and safety. In one embodiment, impacts are measured in regards to specific economic impact, environmental impact, and health and safety impact. In certain embodiments, step 110 may be utilized to apply the best-fit model to predict events and impacts of the predicted events. For example, FIGS. 4A and 4B show exemplary displays of predicted events. FIG. 4A shows an exemplary display that graphically presents predicted loss events. The display may also include historical and substantially recent or present events. FIG. 4B shows an exemplary display that schematically presents the predicted loss events shown in FIG. 4A, such as for conveying information of where within the system the predicted event may occur. Those skilled in the art will readily understand that FIG. 4B may be presented in conjunction with, or independently of FIG. 4A, and vice-versa.

Looking first to FIG. 4A, display 400 extends along an x-axis and a y-axis. In one embodiment, the y-axis is divided into discrete components or subunits of a system, such as the system shown in FIGS. 3 and/or 4B. In another embodiment, each element of the y-axis comprises a category of loss. Thus, in both exemplary embodiments, the elements of the y-axis does not show data collected from a sensor, but rather specific loss(es) that are predicted (or have occurred). For example, the first component along the y-axis is component 402. Component 402 may represent what is referred to in the oil and gas industry as a Mono-Ethylene Glycol System ("MEG system"). Specifically looking to FIG. 4B, exemplary display 410 shows a portion of a system having a MEG subsystem (element 412). For example, any gas transported to element 332 of FIG. 3 may enter through element 408 shown in FIG. 4B, pass through various components and subsystems and be delivered to the MEG system 412. Indeed, in one embodiment, the entire system including all the subsystems shown in FIG. 3 may be provided in display 410, thereby providing a user with a system overview. In certain embodiments, the user may zoom into or otherwise select groups of subsystems or individual subsystems. As shown within element 412. Which represents the MEG system, the system typically comprises an injection unit 411 that injects material having anti-freeze like properties into the flow lines transporting gas to limit or prevent gumming. Thus, by using a MEG system, more oil and/or gas may be extracted over a set period of time. Historically, however, it is hard to predict the failure of the MEG system and even more difficult to predict the impact of the failure on a process or business level.

Returning to FIG. 4A, the x-axis of display 400 represents time. The time may be divided into any measurement of time, such as days, hours, minutes, seconds, or combinations thereof. For discussion purposes only, each time division in display 400 is 1 day. In one embodiment, the display may be adjusted or manipulated by a user. For example, a user may expand upon the predicted loss event, such as altering the time scale to determine a specific hour or minute the predicted loss event is to occur. Looking to display 400, the majority of the display is a uniform shade, indicating that a loss event is not predicted (or has not occurred). There are, however, some different shades in the chart that are indicative of a loss event. Looking specifically to component 402 (representing the MEG system), a loss event is not expected for several days, however, as indicated by element 404, there is a predicted loss event. For example, while the MEG system prevents gumming of the lines, too much water in the flow lines may result in salt build up within the lines. Thus, the shading and/or coloring of element 404 may be used to indicate the estimated loss or the severity of the loss. Indeed, knowing an estimated time-frame for a predicted loss event may be advantageous in further reducing the impact. For example, most industrial processes have "planned kisses." For example, production facilities may have scheduled down times where the production of products or services are reduced or ceased. For example, systems may need to be flushed and/or refueled on a routine basis. Thus, by knowing the timing of the planned losses and the estimated timing of the predicted loss, it may be feasible to take corrective or remedial measures during the planned loss events to prevent the unplanned loss event. In one embodiment, a cheaper corrective measure may be feasible as a short-term fix to allow the system to operate until taking a second more-intensive corrective measure during the planned loss period. Furthermore, in the embodiment shown in FIG. 4A, both historical data and predictive data are displayed. The user may "click on" or otherwise select past data to determine what the loss event was, the severity of the loss event, and/or the corrective measure taken in an attempt to mitigate or eliminate the loss event. In this regard, if another loss event for that category or component is predicted, the user may readily view the past corrective measures to determine the effectiveness of past actions.

Figure 4C:
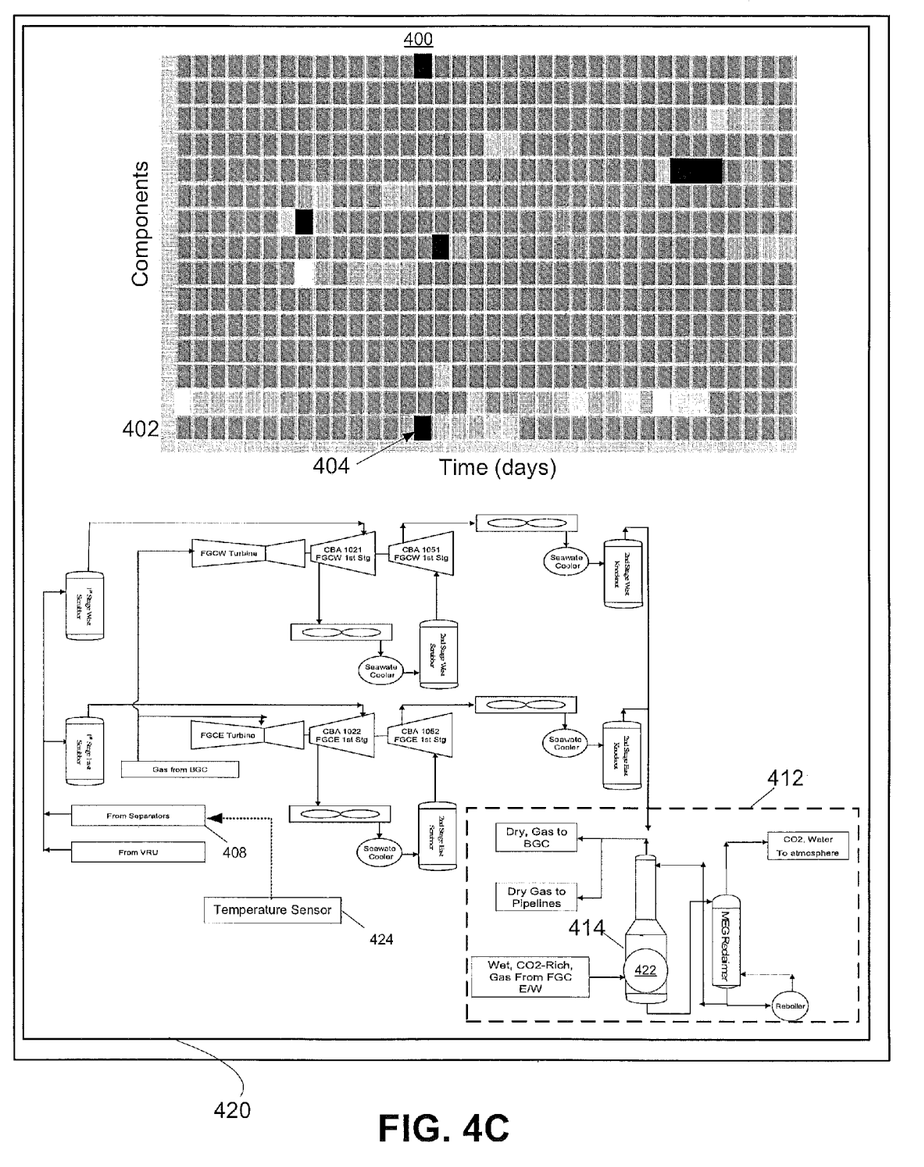

FIG. 4C shows another exemplary display 420 that may be used in conjunction with one or more embodiments of the invention. Specifically, upon conducting step 110 shown in FIG. 1, where the best fit model is applied to determine loss events and the predicted impact of the loss events, display 420 may be used to provide information regarding the timing, location, severity, and cause(s) of the loss event. As seen in the upper portion of display 420, the shading of element 404 indicates that there is a severe predicted loss event within a specific time-frame for the MEG system (represented by row 402). The bottom portion of display 420 provides a schematic diagram of one or more subsystems of the system that may be used to more clearly show where the predicted loss is likely to occur. In one embodiment, visual cue 422 may be associated with one or more components of the MEG system 412 to indicate the location of the predicted loss event. In other embodiments, a user may zoom into or otherwise view information regarding individual pieces within specific components that are likely to fail, so the user can determine if one is readily available or be ordered.

In another embodiment, the potential cause(s) of the predicted loss event may also be graphically displayed. Specifically, element 424 (labeled "Temperature sensor") may represent a temperature sensor on a pipe carrying gas or oil. Temperature sensor 424 may be highlighted or otherwise marked to indicate a potential cause of a loss. The marking may be used to indicate that the temperature within the pipe has exceeded a predefined limit or has risen at a pace that is above a predefined limit. For example, as discussed above, an increase in the temperature of the pipes carrying oil and/or gas may indicate an elevated concentration or volume of water within the pipes. In one embodiment, the user may "click on" or otherwise select temperature sensor 424 to determine the temperature, the rate of increase, or other information. Furthermore, display 420 may also be associated with displays 500 and 510 of FIGS. 5A and 5B, as discussed in more detail below, to view potential preventative measures.

Figure 5A:
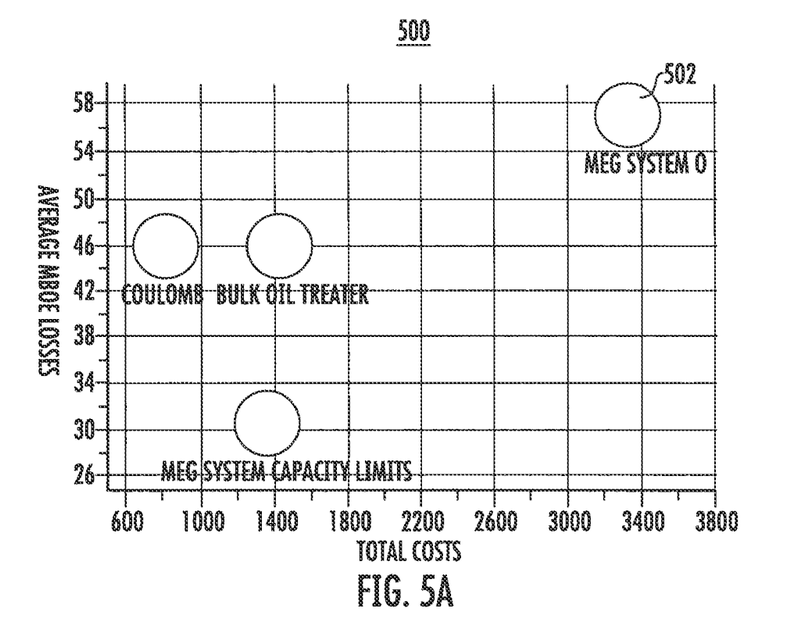
FIGS. 5A and 5B show exemplary displays that may be utilized in accordance with one or more embodiments of the invention.

While the use of coloring and/or shading has been described to convey exemplary embodiments, any indicia that visually conveys a severity of the loss is within the scope of this invention. Furthermore, those skilled in the art will readily understand that other cues, such as sounds, may be used in conjunction with or independent of the visual cues to indicate a loss or severity of said loss. For example, another exemplary view of predicted losses is shown in FIG. 5A. Display 500 extends along an x-axis and a y-axis. The y-axis represents the predicted loss based upon millions of barrels of oil (abbreviated in the oil and gas industry as "MBOE"). The x-axis of display 500 represents the estimated costs based upon business impact. For example, element 502, labeled "MEG System O" is predicted to result in a loss of about 54 to about 59 millions of barrels of oil and an estimated total cost of about 3200 to about 3450. Utilizing the exemplary view in FIG. 5A may be useful when users want to quickly determine what subsystems or components are likely to result in a loss event. Display 500 may also be adjusted to show specific time periods, for example, to display any predicted loss events until the next planned shutdown of a process (planned loss event).

Figure 5B:
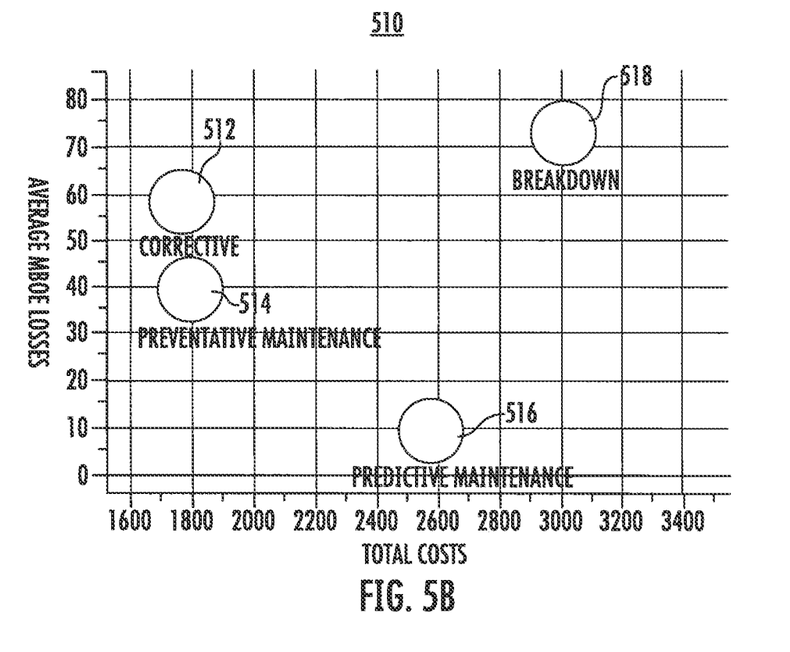

Yet in another embodiment, the user may be able to determine more information regarding the loss event, such more specific information regarding the component or subunit expect the fail, and/or the impacts of the loss event in regards to the economic impact, the environmental impact, and/or the impact on the health and safety. For example, FIG. 5B shows an exemplary display (510) that may provide information regarding a predicted loss event and actions to correct or remedy the loss event. For example, display 510 may be presented to a user that "clicks on" or otherwise selects to view the loss event 502 shown in FIG. 5A. In another embodiment, display 510 may be presented to a user upon "clicking on" or otherwise selecting a portion of the MEG system 412 of FIG. 4B.

As shown in FIG. 5B, display 510 extends along an x-axis and a y-axis. The y-axis represents the predicted average loss based upon millions of barrels of oil. The x-axis represents the estimated costs for each of the displayed preventative measures. As seen, preventative measures 512, 514, and 516, are each shown by way of the average loss in oil and average total costs. For example, performing either "Corrective" measure (element 512) costs slightly less than performing "Preventative Maintenance" measure (element 514), however, "Preventative Maintenance" (514) results in losing much less in terms of MBOE. Conversely, "Predictive Measure" (element 516) costs more than both of the above alternatives (elements 512 and 514), however, results in much less loss when measuring MBOE. In certain embodiments, the preventative measures (512, 514, and 516) may also be viewed in context of not performing any action to eliminate or reduce the impact of the predicted loss event. For example, element 518 (labeled "Breakdown") indicates the predicted loss due to not taking any corrective or preventative action.

As would be appreciated by those skilled in the art, the determination of the severity of the loss event may be tailored to a specific business' need. For example, corporations are becoming increasingly aware that consumer's purchasing decisions may be based on how the company is perceived on impacting the environment. Therefore, in one embodiment, even a slight environmental impact coupled with a large economic impact, may be treated as significantly more important than even an economic impact that is twice as large. Likewise, any predicted loss regarding the health and safety of workers or surrounding residents may be treated significantly more important, even when not coupled with an economic and/or environmental impact.

Step 112 may then be applied to determine at least one intervention that may reduce or eliminate the impact of the predicted event(s). In select embodiments, the intervention(s) may be displayed on a display device, such as being associated with display 510. In one embodiment, interventions are displayed on a display device, wherein at least one intervention differs from another intervention in regards to at least on impact selected from the impact group consisting of: environmental, economic, health and safety; and combinations thereof. For example, a first intervention that calls for repairing a first component may dramatically reduce the economic impact, however, may not substantially reduce an environmental impact, in contrast, a second intervention may reduce the economic impact to a lesser extent, however, will substantially reduce an environmental impact. In certain situations, the second intervention will require different actions and/or components to be repaired than if the first intervention is undertaken. Yet in other situations, the interventions may differ in only the time and/or worker to conduct at least a portion of the intervention.

As seen in FIG. 1, as an intervention is applied (for example, following the determination in step 112), more data could be collected, such as by repeating step 102. While the repetition of step 102 is shown in FIG. 1 as following step 112, the collection of data may be continuous throughout the process and be conducted before, during, or after any of the other steps shown in FIG. 1. Furthermore, other methods may be utilized in conjunction with or independently of the preceding steps. For example, step 114 may be conducted following the preceding steps.

At step 114, the accuracy of the best fit model may be determined, specifically, the actual outcome in terms of economic, environmental, and health and safety can be compared with the predicted outcome according to the predictions based upon the best fit model Not only can the impacts be measured and compared, but the time period in which the loss event was predicted to occur may be compared with the actual timing of a loss event. Indeed, any prediction directly or indirectly based upon the best-fit model may be compared at step 114. In addition or as an alternative to determining the accuracy of the best fit model, the actual outcome may be compared to other models, such as the models from step 108, to determine if another model is more accurate than the best-fit model initially chosen at step 108.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

We claim:

1. A method comprising:
   collecting, from a plurality of sensors that are located at different components of a system, operational data, wherein the operational data includes first data collected from a first sensor located at a first component of the system and second data collected from a second sensor located at a second component of the system, the second component being different from the first component;
   receiving, by a computer system, maintenance data describing maintenance performed on the components of the system, including the first component and the second component, and a time or a date of the maintenance performed on the first component;
   selecting, by a computer system, at least a portion of the operational data and at least a portion of the maintenance data including utilizing a frequency threshold to exclude a portion of the operational data associated with an event that has a likelihood of occurring that is not above a predetermined frequency;
   applying, by a computer system, at least one statistical process to the selected operational data and the selected maintenance data to determine a correlation among the selected operational data and the selected maintenance data for the components of the system including the first component and the second component; and
   predicting, by a computer system, at least one of a loss event and impact of a loss event in terms of at least one of economic impact, environmental impact, and health and safety impact based on the correlation among the selected operational data and the selected maintenance data and operational data and maintenance data for the components of the system including the first component and the second component.

2. The method of claim 1, further comprising:
   receiving extraneous data that comprises at least one of 1) data originated outside the system and 2) data originating inside the system regarding measurement of an external impact source upon the system, excluding any man-made intended input or output of the system or data regarding processing or manufacturing performed by the system,
   wherein applying at least one statistical process to the selected operational data and the selected maintenance data comprises applying at least one statistical process to the selected operational data, the selected maintenance data, and the received extraneous data to determine a correlation among the selected operational data, the selected maintenance data, and the received extraneous data for the components of the system including the first component and the second component, and
   wherein predicting at least one of a loss event and impact of a loss event comprises predicting at least one of a loss event and impact of a loss event based on the correlation among the selected operational data, the selected maintenance data, and the received extraneous data and operational data and maintenance data for the components of the system including the first component and the second component as well as extraneous data comprising at least one of 1) data originated outside the system and 2) data originating inside the system regarding measurement of an external impact source upon the system, excluding any man-made intended input or output of the system or data regarding processing or manufacturing performed by the system.

3. The method of claim 1, wherein the system is utilized in production of a good or service.

4. The method of claim 1, wherein predicting at least one of a loss event and impact of a loss event comprises predicting at least one of a loss event and impact of a loss event for the second component based on operational data and maintenance data collected for the first component.

5. The method of claim 1, further comprising applying features to at least a portion of the selected operational data to amplify patterns before applying the selected operational data to the at least one statistical process.

6. The method of claim 5, further comprising, upon the application of the features, determining to alter the selection of the collected operational data that is utilized.

7. The method of claim 1, wherein selecting at least a portion of the operational data comprises utilizing an impact threshold to remove a portion of the operational data by, when repetitive occurrence routinely or consistently provides an impact below a significant amount, excluding data associated with the impact.

8. The method of claim 1, wherein predicting at least one of a loss event and impact of a loss event comprises predicting a loss event and impact of the loss event, further comprising:
   determining multiple, different preventive measures for reducing the impact of the predicted loss event;
   determining a predicted impact and a predicted cost of using each of the multiple, different preventive measures; and
   controlling display of the multiple, different preventive measures with the predicted impact and the predicted cost for each of the multiple, different preventive measures.

9. The method of claim 1, wherein predicting at least one of a loss event and impact of a loss event comprises predicting impact of a loss event in terms of economic impact, environmental impact, and health and safety impact.

10. A computer system comprising:
    at least one processing device; and
    at least one non-transitory computer-readable storage medium having computer-executable instructions that when executed, by the at least one processing device, cause the at least one processing device to perform operations comprising:
    collecting, from a plurality of sensors that are located at different components of a system, operational data, wherein the operational data includes first data collected from a first sensor located at a first component of the system and second data collected from a second sensor located at a second component of the system, the second component being different from the first component;
    receiving maintenance data describing maintenance performed on the components of the system, including the first component and the second component, and a time or a date of the maintenance performed on the first component;
    selecting at least a portion of the operational data and at least a portion of the maintenance data including utilizing a frequency threshold to exclude a portion of the operational data associated with an event that has a likelihood of occurring that is not above a predetermined frequency;
    applying at least one statistical process to the selected operational data and the selected maintenance data to determine a correlation among the selected operational data and the selected maintenance data for the components of the system including the first component and the second component; and predicting at least one of a loss event and impact of a loss event in terms of at least one of economic impact, environmental impact, and health and safety impact based on the correlation among the selected operational data and the selected maintenance data and operational data and maintenance data for the components of the system including the first component and the second component.

11. The computer system of claim 10, wherein the operations further comprise:

receiving extraneous data that comprises at least one of 1) data originated outside the system and 2) data originating inside the system regarding measurement of an external impact source upon the system, excluding any man-made intended input or output of the system or data regarding processing or manufacturing performed by the system, wherein applying at least one statistical process to the selected operational data and the selected maintenance data comprises applying at least one statistical process to the selected operational data, the selected maintenance data, and the received extraneous data to determine a correlation among the selected operational data, the selected maintenance data, and the received extraneous data for the components of the system including the first component and the second component, and wherein predicting at least one of a loss event and impact of a loss event comprises predicting at least one of a loss event and impact of a loss event based on the correlation among the selected operational data, the selected maintenance data, and the received extraneous data and operational data and maintenance data for the components of the system including the first component and the second component as well as extraneous data comprising at least one of 1) data originated outside the system and 2) data originating inside the system regarding measurement of an external impact source upon the system, excluding any man-made intended input or output of the system or data regarding processing or manufacturing performed by the system.

12. The computer system of claim 10, wherein the system is utilized in production of a good or service.

13. The computer system of claim 10, wherein predicting at least one of a loss event and impact of a loss event comprises predicting at least one of a loss event and impact of a loss event for the second component based on operational data and maintenance data collected for the first component.

14. The computer system of claim 10, wherein the operations further comprise applying features to at least a portion of the selected operational data to amplify patterns before applying the selected operational data to the at least one statistical process.

15. The computer system of claim 14, wherein the operations further comprise, upon the application of the features, determining to alter the selection of the collected operational data that is utilized.

16. The computer system of claim 10, wherein selecting at least a portion of the operational data comprises utilizing an impact threshold to remove a portion of the operational data by, when repetitive occurrence routinely or consistently provides an impact below a significant amount, excluding data associated with the impact.

17. The computer system of claim 10, wherein predicting at least one of a loss event and impact of a loss event comprises predicting a loss event and impact of the loss event, wherein the operations further comprise:

determining multiple, different preventive measures for reducing the impact of the predicted loss event;

determining a predicted impact and a predicted cost of using each of the multiple, different preventive measures; and controlling display of the multiple, different preventive measures with the predicted impact and the predicted cost for each of the multiple, different preventive measures.

18. The computer system of claim 10, wherein predicting at least one of a loss event and impact of a loss event comprises predicting impact of a loss event in terms of economic impact, environmental impact, and health and safety impact.

* * * * *